US012129669B1

(12) United States Patent
Barker et al.

(10) Patent No.: US 12,129,669 B1
(45) Date of Patent: Oct. 29, 2024

(54) APPLICATION DEVICE FOR THE PLACEMENT OF SPREADABLE SUBSTRATES

(71) Applicants: Daniel Rex Barker, Grassy Creek, NC (US); William Timothy Badger, Jefferson, NC (US)

(72) Inventors: Daniel Rex Barker, Grassy Creek, NC (US); William Timothy Badger, Jefferson, NC (US)

( * ) Notice: Subject to any disclaimer, the term of this patent is extended or adjusted under 35 U.S.C. 154(b) by 289 days.

(21) Appl. No.: 17/836,169

(22) Filed: Jun. 9, 2022

Related U.S. Application Data

(60) Provisional application No. 63/210,091, filed on Jun. 14, 2021.

(51) Int. Cl.
*E04F 21/16* (2006.01)
*B05C 17/10* (2006.01)

(52) U.S. Cl.
CPC .............. *E04F 21/16* (2013.01); *B05C 17/10* (2013.01)

(58) Field of Classification Search
CPC ........ B05C 17/10; E04F 21/02; E04F 21/023; E04F 21/06; E04F 21/16; E04F 21/165; E04F 21/1652; E04F 21/20; E04F 21/24; E04F 21/241
USPC .............................. 15/236.05, 236.06, 245.1
See application file for complete search history.

(56) References Cited

U.S. PATENT DOCUMENTS

| | | | |
|---|---|---|---|
| 2,497,578 A * | 2/1950 | Bradley, Jr. ............ | G01N 33/32 15/245.1 |
| 4,892,056 A | 1/1990 | Hawkes | |
| 6,308,370 B1 | 10/2001 | Southby | |
| 6,412,185 B1 | 7/2002 | Mills | |
| 7,735,232 B2 | 6/2010 | Bahler | |
| 10,232,403 B1 | 3/2019 | Daranuta | |
| 10,799,907 B1 | 10/2020 | Daranuta | |

OTHER PUBLICATIONS

Toolbank Express, Border & Mosaic Tile Spreader, https:/www.toolbank.com/0/p/VITBMS632, (accessed Nov. 8, 2021).
Contractorsdirect, Raimondi Colombo Thinset Spreader, https://www.contractorsdirect.com/Raimondi-Colombo-Thinset-Spreader. (accessed Nov. 8, 2021).

* cited by examiner

*Primary Examiner* — Randall E Chin
(74) *Attorney, Agent, or Firm* — Massey Law, PLLC; Carl B. Massey, Jr.

(57) ABSTRACT

The present invention provides a substrate correction device generally consisting of at least four separate plates that are adjustable for depth and width, horizontally and vertically thus capable of correcting a cementitious substrate to the required depth and width to accept a given insert in a predetermined area so that insert is flush with area surrounding the insert. The substrate correction device can also be adjusted, both horizontally and vertically, without plate edges losing their parallel arrangement.

17 Claims, 4 Drawing Sheets

APPLICATION DEVICE FOR THE PLACEMENT OF SPREADABLE SUBSTRATES

CROSS-RELATION TO RELATED PATENT APPLICATION

This application claims benefit of U.S. Provisional Patent Application No. 63/210,091, filed Jun. 14, 2021, the contents of which are incorporated hereby in their entirety.

FIELD OF THE INVENTION

The present invention relates to application devices for correctly spreading substrates. More particularly the invention relates to an application device that is capable of correcting the substrate thickness in a given area of various widths and lengths to accommodate varying thicknesses of tiles, stones, glass, and the like found in tile installation.

BACKGROUND

Tile installation has long been a staple in home building and construction. Over time, new substrate methods and innovative tools have made installation somewhat easier. The adaptation of laser levels, lippage control spacers, preformed bases for showers, etc., have alleviated some of the more difficult tasks of installation so that novices can achieve acceptable quality.

One of the most difficult tasks an installer encounters, however, is installing a tile border where the field tile is large and thick and the border tiles are a mosaic, thin or small tile, or strips on a mesh backing. To achieve a flat surface when finished, the thickness of the substrate behind the mosaic has to be corrected to the proper depth to accommodate installing mosaic or thin tile.

Currently installers use a variety of methods and homemade devices to address the problem, Many of these devices and methods have drawbacks as they only work in one situation and have to be thrown away and another one made for next installation because each tile situation is different. Other filling methods take a great amount of time and labor and do not produce quality results. Some attempts to solve problems facing tile installers in such situations have made, but serious drawbacks persist (e.g., as discussed in U.S. Pat. Nos. 10,232,403 and 10,799,907). While some attempts, have achieved the ability to produce varying substrate levels, the tools involved are difficult to use. One significant problem is that devices such as the ones discussed in the above-noted U.S. patents lack features which allow the internal blades to remain in position to maintain a blade edge that remains parallel to the overall placement of the device and substrate during use. During adjustments, the parts move relative to one another and must be carefully readjusted to produce a parallel blade edge.

Therefore, a need exists in the field for improved substrate correction devices that are capable of producing professional results regardless of the width of the border or the thickness of the mosaic, glass, or thin tile used in the border, while allowing ease and reliability of use.

BRIEF SUMMARY OF THE INVENTION

The present invention comprises a novel substrate correction and application device generally consisting of two outer body plates and two inner blades with two quick release locking mechanisms or other locking device.

The outer body plates and inner blades expand to accommodate varying widths. The inner blades adjust vertically to achieve correct depth of the substrate to be applied. The outer body plates and inner blades adjust horizontally to achieve correct width of the area to be corrected. After adjustments are complete a quick-release mechanism is locked and adjustments stay in place for use.

Accordingly, in one aspect, the invention relates to a device for creating pre-determined levels of substrate for application of tile of differing thickness such that all components of the final tiled surface are flat or flush with one another, where the device comprises at least two outer body plates, and at least two inner blades positioned between the at least two outer body plates, wherein the at least two outer body plates and the at least two inner blades are slidably connected to one another such that the at least two outer body plates and the at least two inner blades can move relative to one another in a horizontal direction, and the at least two inner blades can move relative to the at least two outer body plates in a vertical direction, and wherein the at least two outer body plates and the at least two inner blades remain in position such that their edges remain parallel to one another during adjustments.

In another aspect, the invention relates to a device for creating pre-determined levels of substrate for application of tile of differing thickness such that all components of the final tiled surface are flat or flush with one another, where the device comprises at least two outer body plates, each comprising a horizontal slot, and at least two inner blades positioned between the at least two outer body plates, each comprising a central horizontal slot, and at least one releasable fastener, wherein the at least two outer body plates and the at least two inner blades are slidably connected to one another such that the at least two outer body plates and the at least two inner blades can move relative to one another in a horizontal direction, wherein the releasable fastener is inserted through the horizontal slots and the central horizontal slots, and wherein the at least two inner blades can move relative to the at least two outer body plates in a vertical direction when the releasable fastener is released.

In another aspect, the invention relates to a device for creating pre-determined levels of substrate for application of tile of differing thickness such that all components of the final tiled surface are flat or flush with one another, where the device comprises at least two outer body plates, each comprising a horizontal slot and adjacent hole centrally located with respect to the vertical dimension of each outer body plate, and a tab handle on one side, at least two inner blades positioned between the at least two outer body plates, each comprising a two horizontal slots having an laterally adjacent hole, a ninety degree bend along one vertical edge, and a ninety degree tab on a lower side edge, at least one releasable fastener, and at least four push-in rivets positioned through one hole and one slot of the two inner blades, to slidably secure each inner blade to one another, wherein the at least one of the two outer body plates comprises two vertical grooves along each vertical edge, and wherein each ninety degree bend is slidably positioned in one of the vertical grooves, wherein each outer plate further comprises an upper and lower travel indentation on an inner face, each having a depth to accommodate the head or bottom of the push-in rivet, and a vertical dimension and horizontal dimension to allow vertical and horizontal movement of the inner blades with respect to the outer plates, wherein the at least two outer body plates and the at least two inner blades are slidably connected to one another such that the at least two outer body plates and the at least two inner blades can move relative to one another in a horizontal direction, wherein the releasable fastener is inserted through the horizontal slots and the central horizontal slots, and wherein the at least two inner blades can move relative to the at least two outer body plates in a vertical direction when the releasable fastener is released.

BRIEF DESCRIPTION OF THE DRAWINGS

FIG. 2A shows a plan view of the inner face of a front outer plate; FIG. 2B shows a plan view of an inner blade;

FIG. 2C shows a plan view of the inner face of a rear outer plate; FIG. 2D shows a plan view of the outer face of the rear outer plate as shown in FIG. 2C; and FIG. 2E shows detail of a push-in rivet in a side plan view (top) and a bottom plan view (bottom).

FIGS. 3 and 4, together, show the adjustment and expansion range of one embodiment of the substrate correction device according to the invention.

DETAILED DESCRIPTION OF THE INVENTION

Figure 1:
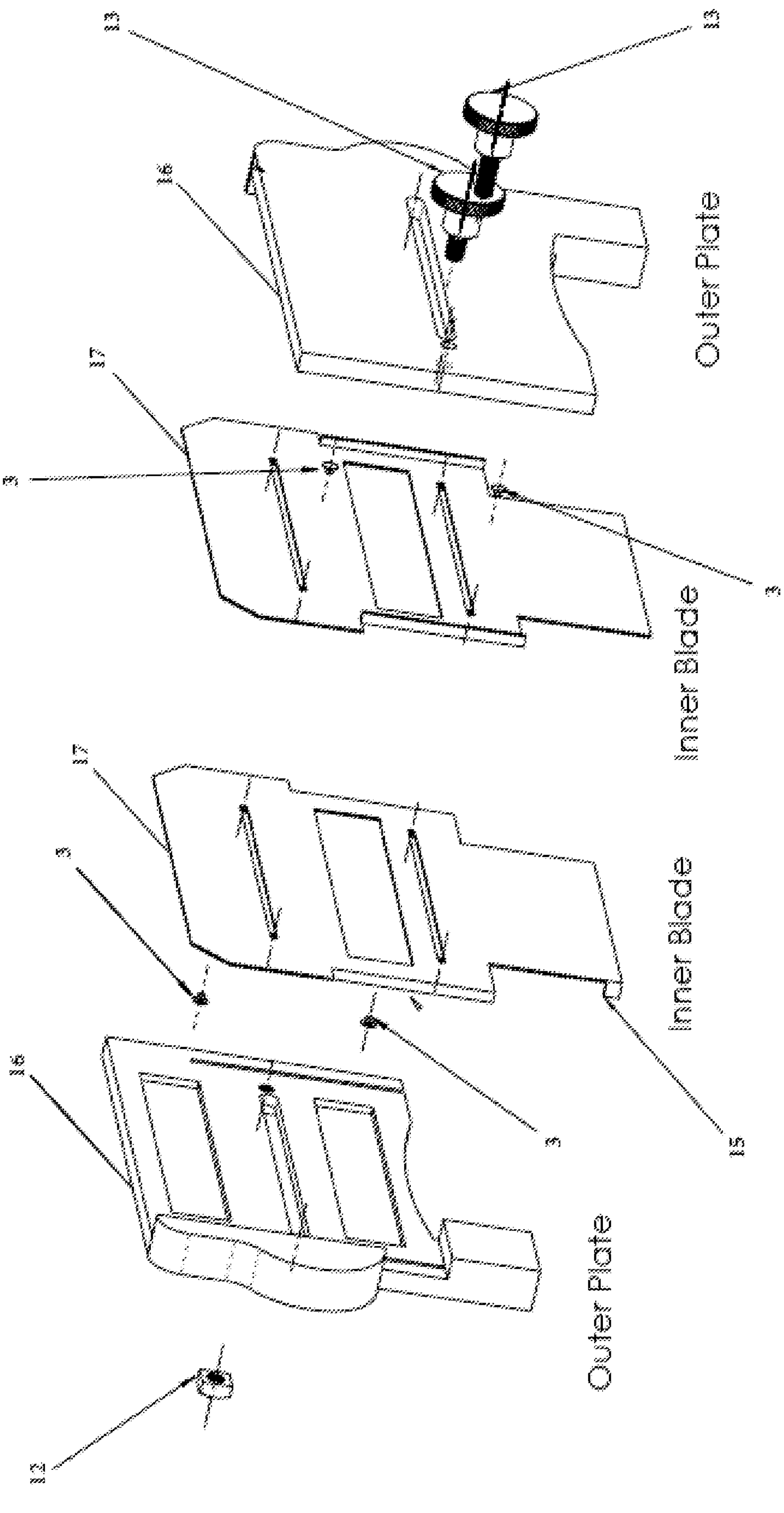
FIG. 1 depicts an exploded view of one embodiment of a substrate correction device according to the present invention.

The terminology used herein is for the purpose of describing particular embodiments only and is not intended to be limiting of the invention. As used herein, the term "and/or" includes any and all combinations of one or more of the associated list items. As used herein, the singular forms "a," "an," and "the" are intended to include the plural forms as well as the singular forms, unless the context clearly indicates otherwise. It will be further understood that the terms "comprises" and or "comprising" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

New substrate correction devices, apparatuses and methods for correcting substrates are discussed herein. In the following description, for purposes of explanation, numerous specific details are set forth in order to provide a thorough understanding of the present invention. It will be evident to one skilled in the trade that the present invention may be utilized without certain of these specific details or with other modifications present.

Accordingly, in one aspect, the invention relates to a device for creating pre-determined levels of substrate for application of tile of differing thickness such that all components of the final tiled surface are flat or flush with one another, where the device comprises at least two outer body plates, and at least two inner blades positioned between the at least two outer body plates, wherein the at least two outer body plates and the at least two inner blades are slidably connected to one another such that the at least two outer body plates and the at least two inner blades can move relative to one another in a horizontal direction, and the at least two inner blades can move relative to the at least two outer body plates in a vertical direction, and wherein the at least two outer body plates and the at least two inner blades remain in position such that their edges remain parallel to one another during adjustments.

In some embodiments, the at least two outer body plates and the at least two inner blades comprise horizontal slots which receive a releasable fastener to allow horizontal sliding of the at least two inner blades and the at least two outer plates, relative to one another. In some embodiments, the releasable fastener is quick-release mechanism. In some embodiments, the quick-release mechanism is a cam-locking quick release mechanism.

In some embodiments, the at least two outer body plates and the at least two inner blades each comprise a horizontal slot which receive a releasable fastener to allow vertical sliding of the at least two inner blades relative to the at least two outer plates.

In some embodiments, the at least two inner blades each further comprise a ninety degree bends along one vertical edge and the at least two outer plates each further comprise two vertical grooves along each vertical edge; and wherein each ninety degree bend of the at least two inner blades is slidably positioned in one of the vertical grooves of the at least two outer plates.

In some embodiments, each inner blade further comprises a ninety degree tab on a lower side edge.

In some embodiments, each outer body plate comprises a tab handle on one side.

In some embodiments, each inner blade further comprises a horizontal slot and adjacent hole centrally located with respect to the vertical dimension of each inner blade. In some embodiments, the device further comprises two push-in rivets which are each inserted through the hole of one inner blade and the slot of the other inner blade to slidably secure each inner blade to one another. In some embodiments, each outer plate further comprises an upper and lower travel indentation on an inner face, each having a depth to accommodate the head or bottom of the push-in rivet, and a vertical dimension and horizontal dimension to allow vertical and horizontal movement of the inner blades with respect to the outer plates.

In one aspect, the invention relates to a device for creating pre-determined levels of substrate for application of tile of differing thickness such that all components of the final tiled surface are flat or flush with one another, where the device comprises at least two outer body plates, each comprising a horizontal slot, and at least two inner blades positioned between the at least two outer body plates, each comprising a central horizontal slot, and at least one releasable fastener, wherein the at least two outer body plates and the at least two inner blades are slidably connected to one another such that the at least two outer body plates and the at least two inner blades can move relative to one another in a horizontal direction, wherein the releasable fastener is inserted through the horizontal slots and the central horizontal slots, and wherein the at least two inner blades can move relative to the at least two outer body plates in a vertical direction when the releasable fastener is released.

In some embodiments, the at least two inner blades each further comprise a ninety degree bend along one vertical edge and at least one of the at least two outer plates further comprises two vertical grooves along each vertical edge; and wherein each ninety degree bend is slidably positioned in one of the vertical grooves.

In some embodiments, each inner blade further comprises a ninety degree tab on a lower side edge.

In some embodiments, each outer body plate comprises a tab handle on one side.

In some embodiments, each inner blade further comprises a horizontal slot and adjacent hole centrally located with respect to the vertical dimension of each inner blade. In some embodiments, the device further comprises two push-in rivets which are each inserted through the hole of one inner blade and the slot of the other inner blade to slidably secure each inner blade to one another. In some embodiments, each outer plate further comprises an upper and lower travel indentation on an inner face, each having a depth to accommodate the head or bottom of the push-in rivet, and a vertical dimension and horizontal dimension to allow vertical and horizontal movement of the inner blades with respect to the outer plates.

In one aspect, the invention relates to a device for creating pre-determined levels of substrate for application of tile of differing thickness such that all components of the final tiled surface are flat or flush with one another, where the device comprises at least two outer body plates, each comprising a horizontal slot and adjacent hole centrally located with respect to the vertical dimension of each outer body plate, and a tab handle on one side, at least two inner blades positioned between the at least two outer body plates, each comprising a two horizontal slots having an laterally adjacent hole, a ninety degree bend along one vertical edge, and a ninety degree tab on a lower side edge, at least one releasable fastener, and at least four push-in rivets positioned through one hole and one slot of the two inner blades, to slidably secure each inner blade to one another, wherein the at least one of the two outer body plates comprises two vertical grooves along each vertical edge, and wherein each ninety degree bend is slidably positioned in one of the vertical grooves, wherein each outer plate further comprises an upper and lower travel indentation on an inner face, each having a depth to accommodate the head or bottom of the push-in rivet, and a vertical dimension and horizontal dimension to allow vertical and horizontal movement of the inner blades with respect to the outer plates, wherein the at least two outer body plates and the at least two inner blades are slidably connected to one another such that the at least two outer body plates and the at least two inner blades can move relative to one another in a horizontal direction, wherein the releasable fastener is inserted through the horizontal slots and the central horizontal slots, and wherein the at least two inner blades can move relative to the at least two outer body plates in a vertical direction when the releasable fastener is released.

The present disclosure is to be considered as an exemplification of the invention and is not intended to limit the invention to the specific embodiments portrayed by the figures and described below.

FIG. 1 illustrates an exploded view of components of one embodiment of the substrate correction device. In preferred embodiments, the device will consist of two outer body plates 16, two inner blades 17, four push-in rivets 3 or similar connecting hardware, two quick release mechanisms 13 or other locking mechanisms and floating, sliding, or embedded nuts 12. Ninety degree bends 6 and tabs 15 are also shown.

When the substrate correction device is assembled and quick-release mechanisms 13 are disengaged, the width of the device (outer plates 16 and inner blades 17) can be adjusted, as well as the height of the inner blades 17 (i.e., adjustment of their depth relative to the substrate and outer plates 16). To accomplish this without misalignment of the inner blades 17 relative to one another or the outer body plates 16, ninety degree bends 6 remain seated within vertical grooves 7, while allowing vertical movement of ninety degree bends 6 within the vertical length of vertical grooves 7 (see FIGS. 2A-2C). This placement also serves to ensure that each inner blade 17 moves horizontally, and adjacent to, an adjacent outer plate 16 to adjust width.

Figure 2B:
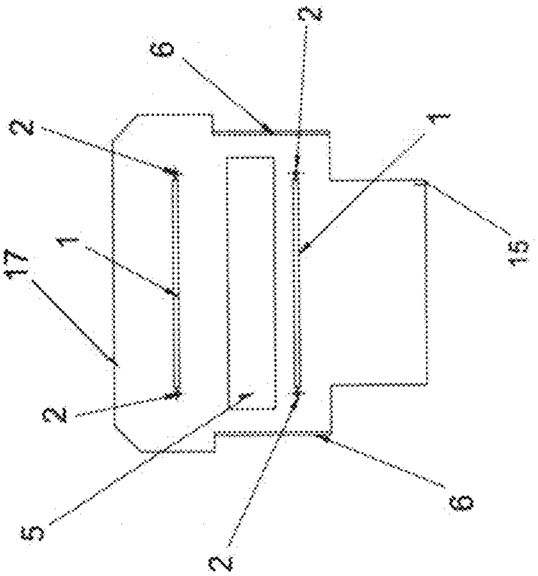
FIG. 2A-FIG. 2E provide detailed views of particular elements of one embodiment of a substrate correction device according to the present invention.
Figure 2E:
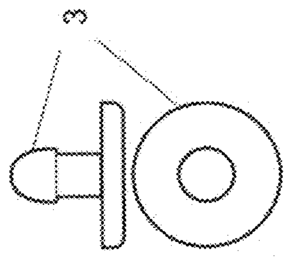
Figure 2A:
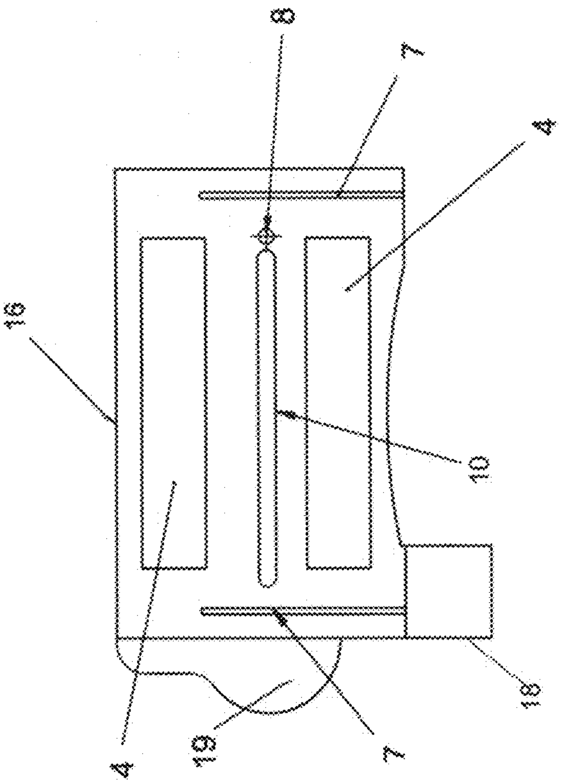
Figure 2D:
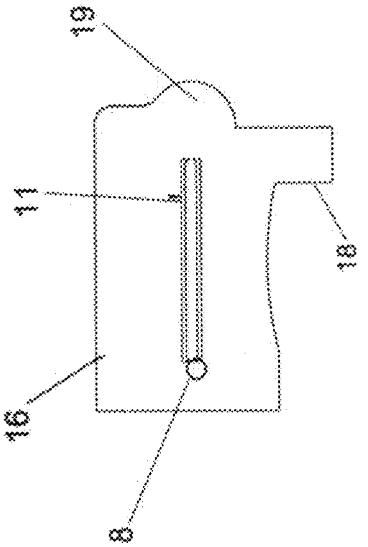
Figure 2C:
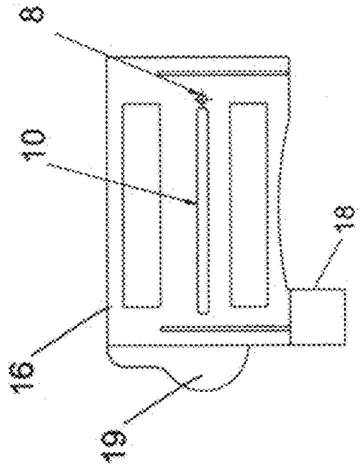

Travel indentations 4 on the inner face of outer plates 16 allow for sufficient vertical movement of inner blades 17 relative to outer body plates 16 during this adjustment; see FIG. 2A-FIG. 2C. Travel indentations 4 have a depth which receives one end of push-in rivets 3 (see FIG. 2E for an enlarged side plan view and bottom plan view of push-in rivet 3; see FIG. 1 for positioning of push-in rivets 3). Otherwise, the push-in rivets 3 would interfere with free travel during adjustment. Thus, the travel indentations allow both vertical and horizontal movement of the terminal end of push-in rivets 3 during adjustment.

Slots 1 and holes 2, located top and bottom of inner blades, allow inner blades 17 to be connected together by push-in rivets 3 at four locations (each push-in rivet 3 connects one hole 2 with one slot 1; see FIG. 1 and FIG. 2B). This configuration accomplishes connections and stability, while enabling adjustment of width. Together with quick-release mechanisms 13, slot 10 and hole 8 these features ensure that when the substrate correction device is loosened for width and depth adjustments, the edges of the outer body plates 16 and the inner blades 17 maintain their positions such that the bottom and side edges remain parallel to one another. Together, these features allow loosening of the overall arrangement to allow height and width adjustment without inner blades 17 becoming misaligned with each other with or with respect to outer body plates 16.

The larger center slots 5 in inner blades 17 allow for the connection and adjustment expansion of the outer body plates 16 as well as vertical and horizontal adjustment of inner blades 17. Shafts of quick-release mechanism pass through the large center slots 5 in inner blades 17, as well as through holes 8 and slots 10 of outer plates 16. The ninety degree bends 6 on each side of inner blades 17 serve multiple functions. Primarily, they serve to guide the inner blades 17 as they adjust vertically. Also, they fit into vertical grooves 7 and allow the inner blades 17 to be pulled apart and expanded relative to one another by the handles 19 on the outer body plates 16 on each end of the inside of outer body plates 16. Another function of the vertical grooves 7 is to act as a stop for the vertical movement of the inner blades 17.

Figure 5:
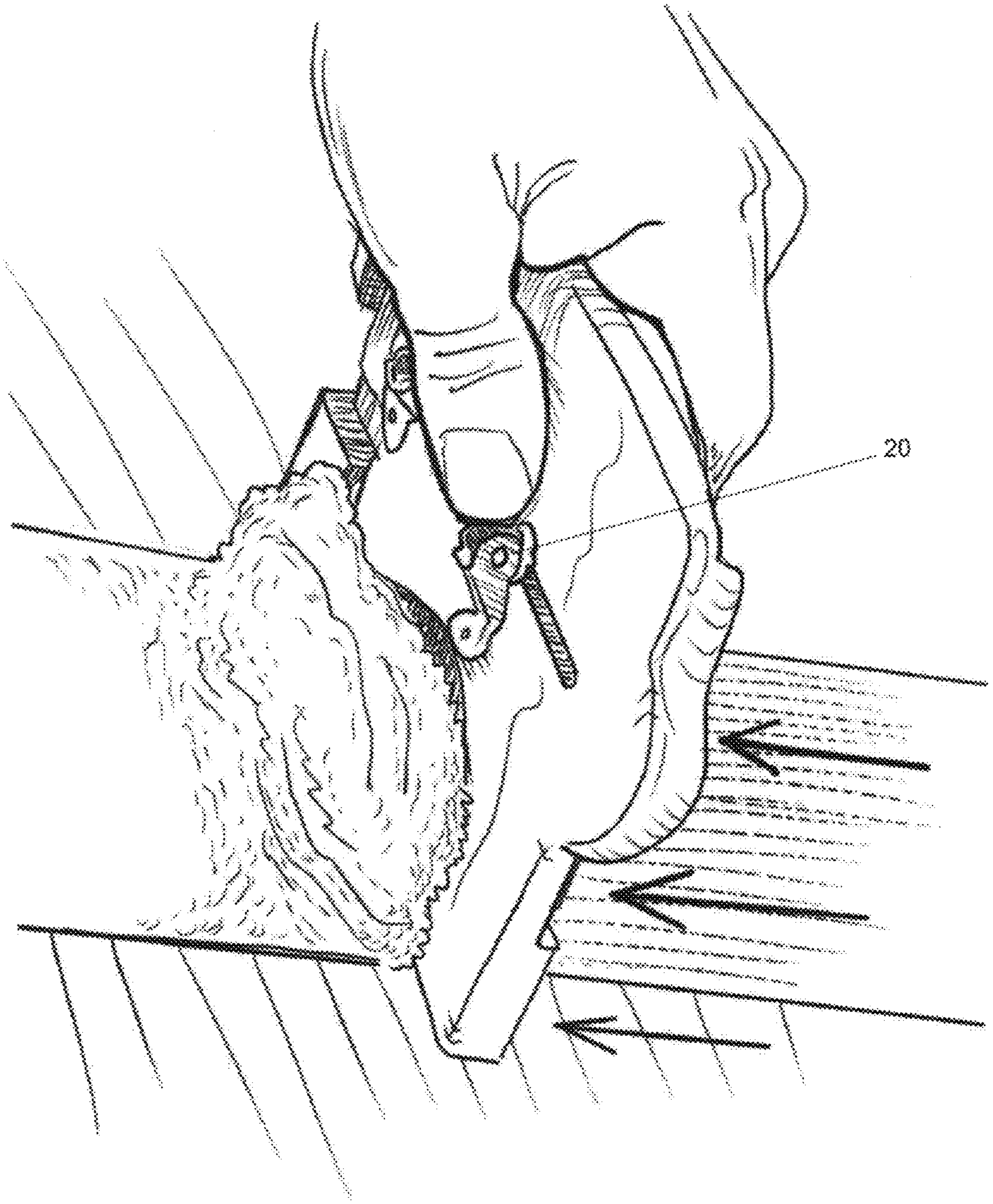
FIG. 5 shows a perspective view of one embodiment of the substrate correction device in use and positioned on substrate to be corrected according to the present invention.

The front outer plate 16 is designed with a hole 8 and a slot 10 to accommodate horizontal travel and movement. The hole 8 accepts a quick release locking mechanism 13 that serves as a pin that connects all components together. When released the outer body plates 16 and inner blades 17 are free to expand and adjust (travel) vertically and horizontally to desired width and depth. When locked, all components are stationary. As seen in FIG. 1, outer body back 16 incorporates a slot 10 with a groove 11 and a sliding square nut 12 positioned on the outside of the back outer plate 16. The sliding square nut 12 is attached to the quick release locking mechanism 13. In some embodiments, the groove 11, surrounding slot 10, is designed to accept the sliding square nut 12, or locking thumbnut, which can slide horizontally for adjustment and stability. In some embodiments, a stationary embedded nut is used instead of hole 8 on the outside of at least one outer body plate 16, to accept quick release mechanism 13. As shown in FIG. 1, the quick-release mechanism 13 is a screw-type mechanism. Alternatively, in other embodiments, quick-release mechanism 13 can be a cam-lock quick release mechanism 20, e.g., as shown in FIG. 5. Hole 8, or in some embodiments a stationary embedded nut, functions to keep quick-release mechanism 13 in a stationary position relative to one outer body plate 16 (a shaft of quick-release mechanism 13 moving horizontally within slot 10 on the opposite outer body plate 16).

Figure 4:
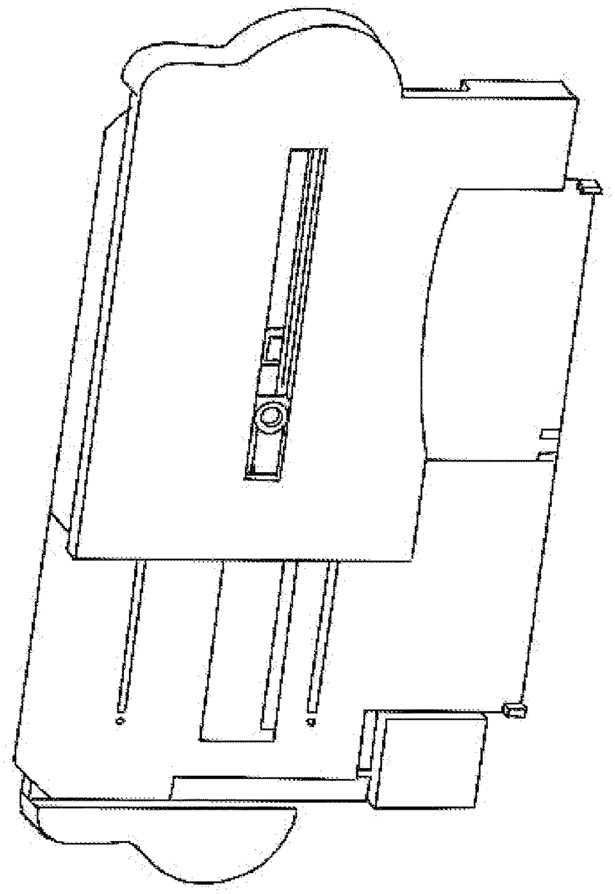
FIG. 4 shows a perspective view of one embodiment of the substrate correction device in the open position (just short of the widest position).
Figure 3:
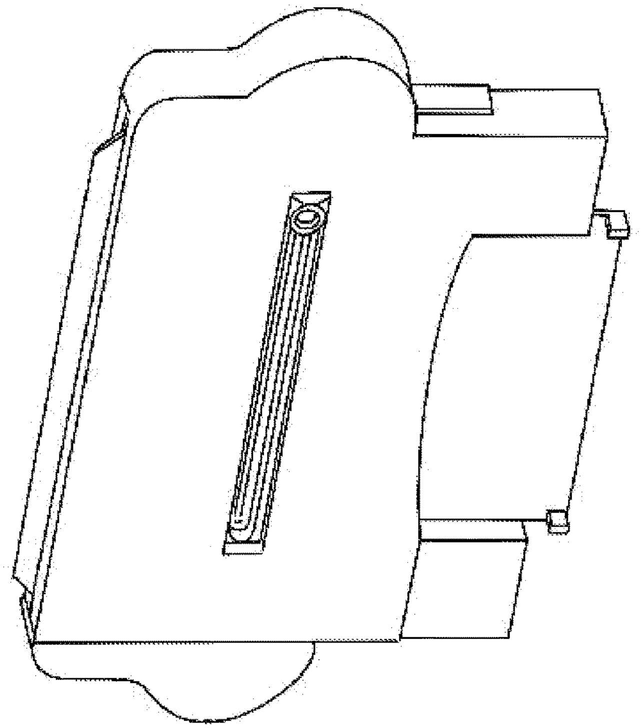
FIG. 3 shows a perspective view of one embodiment of the substrate correction device in the closed (most narrow) position.

The two small ninety degree tabs 15 on the inner blades 17 are designed to operate as a guide to prevent inner blades 17 from accidentally entering a void or mortar joint when in use. Although the inner blades 17 are otherwise identical in shape, a ninety degree tab 15 on one inner blade 17 is bent in the opposite direction from the bend on the other tab 15 on the other inner blade 17, such that both ninety degree tabs 15 bend in the same direction when the substrate correction device is assembled. Both ninety degree tabs 15 bend in the direction opposite the direction of movement of the substrate correction device when in use; see FIGS. 3 and 4. As noted, this feature prevents the inner blades 17 from entering a void or mortar or grout joint and interrupting the smooth travel of the substrate correction device.

Each outer plate 16 comprises a screed leg 18, such that when the substrate correction device is assembled a screed leg 18 is positioned on either side of the substrate correction device. These assist the user with maintaining a flat or flush position as the substrate correction device Is advanced on the substrate by supporting the substrate correction device on either side (see FIG. 5). Further, each outer plate can include a tab handle 19, which can be gripped by the user and is used to adjust the width of the substrate correction device (see FIGS. 2A, 2C, and 2D).

In describing the invention, it will be understood that a number of aspects are disclosed. Each of these has individual benefit and each can also be used in conjunction with one or more, or in some cases all, of the other disclosed aspects. Accordingly, for the sake of clarity, this description will refrain from repeating every possible combination of the aspects in an unnecessary fashion. Nevertheless, the specification and claims should be read with the understanding that such combinations are entirely within the scope of the invention and claims.

We claim:

1. A device for creating pre-determined levels of substrate for application of tile of differing thickness such that all components of the final tiled surface are flat or flush with one another, the device comprising:

a) at least two outer body plates, and b) at least two inner blades positioned between the at least two outer body plates, wherein the at least two outer body plates and the at least two inner blades are slidably connected to one another such that the at least two outer body plates and the at least two inner blades can move relative to one another in a horizontal direction, and the at least two inner blades can move relative to the at least two outer body plates in a vertical direction, and wherein the at least two outer body plates and the at least two inner blades remain in position such that their edges plates remain parallel to one another during adjustments, and wherein the at least two inner blades each further comprise ninety degree bends along one vertical edge of the at least two inner blades and the at least two outer plates each further comprise two vertical grooves along each vertical edge of the at least two outer plates; and wherein each ninety degree bend of the at least two inner blades is slidably positioned in one of the vertical grooves of the at least two outer plates.

2. The device of claim 1, wherein the at least two outer body plates and the at least two inner blades comprise horizontal slots which receive a releasable fastener to allow horizontal sliding of the at least two inner blades and the at least two outer plates, relative to one another.

3. The device of claim 2, wherein the releasable fastener is a quick-release mechanism.

4. The device of claim 3, wherein the quick-release mechanism is a cam-locking quick release mechanism.

5. The device of claim 1, wherein the at least two outer body plates and the at least two inner blades each comprise a horizontal slot which receive a releasable fastener to allow vertical sliding of the at least two inner blades relative to the at least two outer plates.

6. The device of claim 1, wherein each inner blade further comprises a ninety degree tab on a lower side edge.

7. The device of claim 1, wherein each outer body plate comprises a tab handle on one side.

8. The device of claim 1, wherein each inner blade further comprises a horizontal slot and adjacent hole.

9. The device of claim 8, wherein the device further comprises two push-in rivets, each of which are inserted through the adjacent hole of one inner blade and the horizontal slot of the other inner blade to slidably secure each inner blade to one another.

10. The device of claim 9, wherein each outer plate further comprises an upper and lower travel indentation on an inner face, each having a depth to accommodate a head or a bottom of the push-in rivet, and a vertical dimension and horizontal dimension to allow vertical and horizontal movement of the inner blades with respect to the outer plates.

11. A device for creating pre-determined levels of substrate for application of tile of differing thickness such that all components of the final tiled surface are flat or flush with one another, the device comprising:

a) at least two outer body plates, each comprising a horizontal slot, and b) at least two inner blades positioned between the at least two outer body plates, each comprising a central horizontal slot, wherein the at least two outer body plates and the at least two inner blades are slidably connected to one another such that the at least two outer body plates and the at least two inner blades can move relative to one another in a horizontal direction, and wherein the at least two inner blades can move relative to the at least two outer body plates in a vertical direction, and wherein each inner blade further comprises a horizontal slot and adjacent hole.

12. The device of claim 11, wherein the at least two inner blades each further comprise a ninety degree bend along one vertical edge of the at least two inner blades and at least one of the at least two outer plates further comprises two vertical grooves along each vertical edge of the at least two outer plates; and wherein each ninety degree bend is slidably positioned in one of the vertical grooves.

13. The device of claim 11, wherein each inner blade further comprises a ninety degree tab on a lower side edge.

14. The device of claim 11, wherein each outer body plate comprises a tab handle on one side.

15. The device of claim 11, wherein the device further comprising two push-in rivets, each of which are inserted through the adjacent hole of one inner blade and the horizontal slot of the other inner blade to slidably secure each inner blade to one another.

16. The device of claim 11, wherein each outer plate further comprises an upper and lower travel indentation on an inner face, each having a depth to accommodate a head or a bottom of a push-in rivet, and a vertical dimension and horizontal dimension to allow vertical and horizontal movement of the inner blades with respect to the outer plates.

17. A device for creating pre-determined levels of substrate for application of tile of differing thickness such that all components of the final tiled surface are flat or flush with one another, the device comprising:

a) at least two outer body plates, and b) at least two inner blades positioned between the at least two outer body plates, wherein the at least two outer body plates and the at least two inner blades are slidably connected to one another such that the at least two outer body plates and the at least two inner blades can move relative to one another in a horizontal direction, and the at least two inner blades can move relative to the at least two outer body plates in a vertical direction, and wherein each inner blade further comprises a ninety degree tab on a lower side edge.

* * * * *